US008514494B2

(12) United States Patent
Alcazar et al.

(10) Patent No.: US 8,514,494 B2
(45) Date of Patent: Aug. 20, 2013

(54) METHOD FOR INSERT MOLDING GLASS OR AN INORGANIC MATERIAL

(75) Inventors: Ross Alcazar, Aurora, IL (US); Jie Meng, Shanghai (CN)

(73) Assignee: Hi-P International Limited, Singapore (SG)

( * ) Notice: Subject to any disclaimer, the term of this patent is extended or adjusted under 35 U.S.C. 154(b) by 41 days.

(21) Appl. No.: 12/736,969

(22) PCT Filed: Jan. 22, 2010

(86) PCT No.: PCT/SG2010/000016
§ 371 (c)(1),
(2), (4) Date: Nov. 16, 2010

(87) PCT Pub. No.: WO2010/132023
PCT Pub. Date: Nov. 18, 2010

(65) Prior Publication Data
US 2012/0044590 A1  Feb. 23, 2012

(30) Foreign Application Priority Data

May 15, 2009  (SG) .................................. 200903358

(51) Int. Cl.
*G02B 3/00* (2006.01)
*G02B 7/02* (2006.01)
*B29D 11/00* (2006.01)

(52) U.S. Cl.
USPC .............................. 359/642; 359/819; 264/2.5

(58) Field of Classification Search
USPC .................... 359/642, 694–830; 264/1.1–2.7
See application file for complete search history.

(56) References Cited

U.S. PATENT DOCUMENTS

| 3,888,568 | A | * | 6/1975 | Norris et al. | 359/823 |
| 5,680,260 | A | * | 10/1997 | Farcella et al. | 359/819 |
| 7,038,856 | B2 | * | 5/2006 | Quake et al. | 359/661 |
| 8,119,048 | B2 | * | 2/2012 | Nishimura | 264/252 |
| 2008/0242384 | A1 | | 10/2008 | Hsu et al. | |
| 2008/0247538 | A1 | | 10/2008 | Wu | |

FOREIGN PATENT DOCUMENTS

EP  2066162  6/2009

OTHER PUBLICATIONS

Written Opinion for Singapore Appln. corresponding to U.S. Appl. No. 12/736,969, mailed Sep. 16, 2010.
PCT International Search Report for PCT/SG2010/000016, International filing date Jan. 22, 2010.

* cited by examiner

*Primary Examiner* — Mohammed Hasan
(74) *Attorney, Agent, or Firm* — Davidson Berquist Jackson & Gowdey, LLP (57) ABSTRACT

The present invention relates to insert molding a glass lens or an inorganic material into a front housing unit. The glass lens or an inorganic material is aligned within the front housing unit so that it lies within the inside of the front housing unit. A thermobond adhesive or an adhesive promoter is applied onto the glass lens or the inorganic material. During molding a molten resin is injected into the space formed between the glass lens or the inorganic material and the front housing unit and flows around the glass lens or the inorganic material activating and liquefying the adhesive promoter or the thermobond adhesive and forming an insert molded part.

10 Claims, 8 Drawing Sheets

Masking the glass lens first, then making painting or NCVM.

METHOD FOR INSERT MOLDING GLASS OR AN INORGANIC MATERIAL

FIELD OF INVENTION

This invention relates to generally to the field of insert molding, and in particular, to glass insert molding for the design of electronics devices with display module in cellular phones and other types of telephones and, also to inorganic material insert molding, and further in particular, in using a heat activated adhesive during an insert molding process.

BACKGROUND OF THE INVENTION

The display module in electronic devices such as cellular telephones and PCS telephones that are currently available are typically assembled using traditional lens assembly process such as a multi-step process performed by different machines required to be used to produce the lenses and assembled into a housing by secondary processes using common bonding method of lens assembly such as typically two-sided adhesives, thermal glue and liquid glue. Polymeric materials are usually used in the assembly. Such methods are both expensive and the overall assembly tends to be bulky.

In the foregoing, there is therefore a need to find ways to simplify the assembly process with simpler lens materials and to reduce the cost of the assembly process.

SUMMARY OF THE INVENTION

The present invention aims at solving one or more of the above described problems. The present invention provides a process to produce a glass insert molding housing unit which simplifies the assembly process and reduces the cost of the assembly process. The present invention further provides a process of using a heat activated adhesive and an inorganic material to produce an insert molded part which is an unique improvement of what is available in the industry.

The present invention provides a glass lens and a front housing unit in the shape of the glass lens. The glass lens is inserted into the front housing unit. The glass lens is aligned within the front housing unit so that the glass lens lies within the inside of the front housing unit. During the glass insert molding process, a molten resin is injected into the space formed by the glass lens and the front housing unit. The molten resin flows around the glass lens and forms a glass insert molding housing unit. Once the resin hardens, the front housing unit encapsulates the glass lens so that the glass lens permanently bonds within the front housing unit.

The present invention further provides an adhesive promoter. The adhesive promoter is applied to the glass lens prior to the glass insert molding process. During the glass insert molding process, the molten resin has an additional purpose which is to activate and liquefy the adhesive promoter to create heat and pressure.

The present invention further provides a thermobond adhesive. The thermobond adhesive is applied to the glass lens prior to the glass insert molding process. During the glass insert molding process, the molten resin has an additional purpose which is to activate and liquefy the thermobond adhesive to create heat and pressure.

The present invention further provides an inorganic material and a front housing unit. The inorganic material is inserted into the front housing unit and aligned with the front housing unit in order that the inorganic material lies within the inside of the front housing unit. The present invention further provides a thermobond adhesive. The thermobond adhesive is firstly applied onto the inorganic material. After application of the thermobond adhesive, the next stage is the process of insert molding. A molten resin is injected into space formed by the inorganic material and the front housing unit. The molten resin flows around the inorganic material, activates and liquefies the thermobond adhesive that is applied onto the inorganic material. An insert molded part is formed. When the insert molded part is ejected and cooled, the thermobond adhesive permanently bonds the inorganic material and the molten resin. The inorganic material can be ceramic, metals, fabric, plastics etc.

DETAILED DESCRIPTION OF THE INVENTION

The context of an embodiment of the present invention is shown in the drawings (FIGS. 1-8) and these drawings are not to be taken as limiting the scope of the application of the process of the inventive method.

The present invention is expected to achieve the desired purpose of substantially reduce the thickness of the housing unit. To achieve this, glass is used instead of polymeric materials. Glass is good to use than the common lens that is currently used in the market. This is because glass provides hardness, stiffness, and thinnest structure at the same time. Glass is never used in the past because if glass per se is used, breakage tends to occur. In the present invention, however, glass undergoes some chemical hardening in order to strengthen the glass.

In addition, glass has a better mechanical performance than the traditional material lens like polymeric materials. In addition, glass acts as the frame in the housing unit, which offers the designer the opportunity to make the electronic devices with display of cellular and PCS telephones slimmer.

The present invention seeks to insert glass directly into the material of housing directly by injection molding. This is aimed to solve the dust proof issue brought by traditional lens assembly process thoroughly. Further, the glass insert molding process helps to reduce the assembly process of the lens. And the overall assembly tends to be less bulky than what is offered in the market.

Furthermore, glass is cheap and the overall cost of production is becomes much cheaper. In addition, glass is scratch resistance and glass tends to undergo very little wear or tear.

Figure 1:
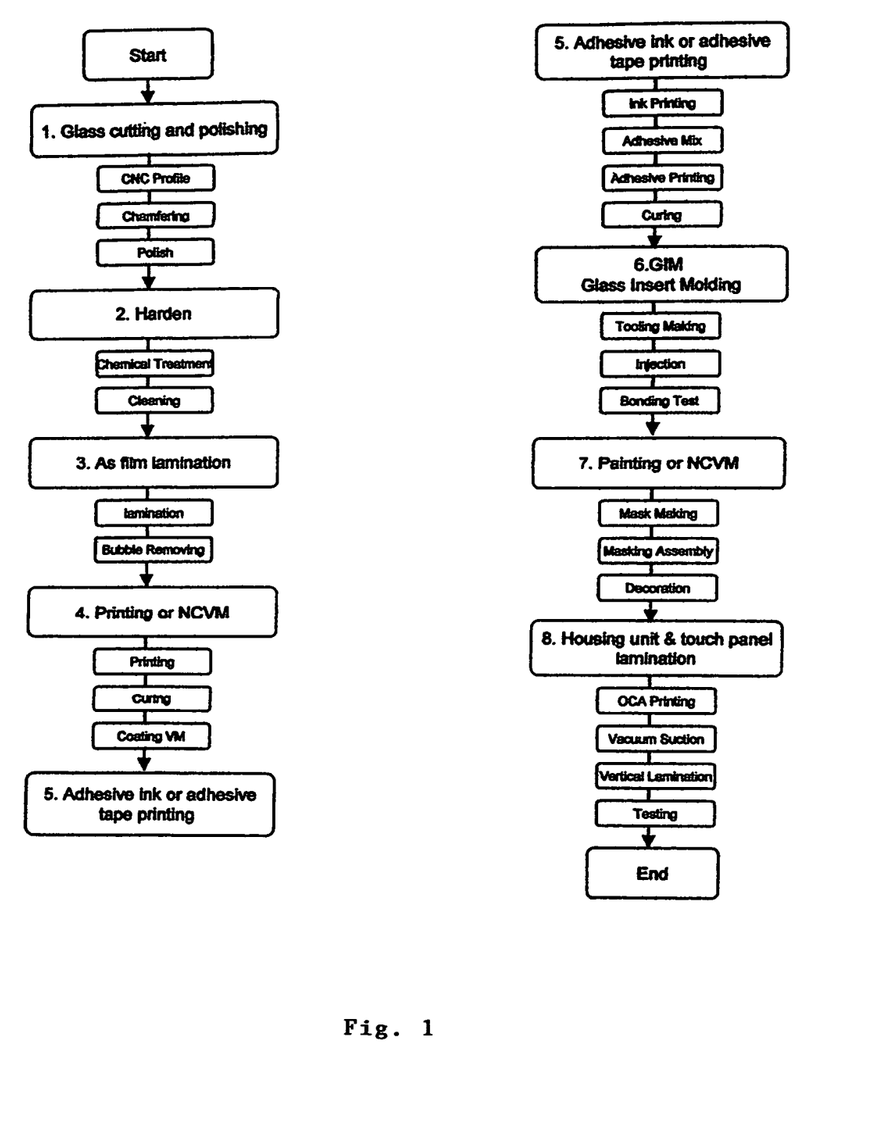
FIG. 1 shows a manufacturing process flow chart of the present invention.

FIG. 1 shows a manufacturing process flow chart where a raw glass goes through a series of eight steps to produce a glass molded housing unit. In the first-fifth stage known as the pre-processing of glass lens, the raw glass undergoes a cutting and polishing process where the raw glass is cut using a Computer controlled cutting ("CNC") profile machine; the edges or corners of the raw glass is cut using a chamfering equipment before it undergoes polishing through the polishing machine to obtain a glass lens.

Thereafter, the glass lens is hardened in an oven by chemically treated using a chemical reagent. This is because chemical hardening is a strengthening process of the glass lens. After this process, the harden glass lens is cleaned using an ultrasonic line.

In the third step, the harden glass lens goes through a lamination machine using Anti-Splinter ("AS") film lamination to obtain a harden glass lens with a layer of film on it. Bubbles from the harden glass lens lamination are removed manually.

In the fourth step, the harden glass lens undergoes printing using printing ink, curing and coating with paint (VM). The purpose of this step is to apply decoration on the glass lens.

The majority of the adhesive promoter/thermobond adhesive ("TBA") in the current industry is often used after one part of a housing is already molded. The molded part is joined to a glass lens or an inorganic material such as metals, ceramic etc using the adhesive promoter/TBA. The glass lens or the inorganic material is heated and then the adhesive promoter/TBA is molten and liquefied on the heated glass lens or the heated inorganic material.

Thereafter, the molded part is joined to the glass lens or the inorganic material under pressure and with additional heat. After cooling, the bond between the molded part and the glass lens or the inorganic material is created. This is currently what is available and used in the industry.

In the present fifth step, the harden glass lens obtained in the fourth step goes through ink printing using the stencil machine. Thereafter, the harden glass lens undergoes a process of overmolding through adhesive mix and adhesive printing. The use of an adhesive promoter is significantly unique as a heat activated adhesive in the present invention. This is because the heat activated adhesive has never been activated through a molding process. It is usually activated through reflow oven or as hot press with parts already molded.

In this step, the heat activated adhesive also known as an adhesive promoter/thermobond adhesive ("TBA") is applied firstly onto the harden glass lens prior to the glass insert molding process.

Applying adhesive promoter/TBA onto the glass lens or any other inorganic material is particularly important as the adhesive promoter/TBA has never been applied prior or through an insert molding process in the current industry.

During the sixth step which is the housing unit glass insert molding stage, the harden glass lens undergoes the tooling making process where the glass lens is put into a front housing unit. The glass lens aligns with the front housing unit so that the glass lens lies within the inside of the front housing unit.

In the injection process of the sixth step, a molten resin is injected into the space forms between the glass lens and the front housing unit. The molten resin flows around the glass lens and forms a glass housing unit. The molten resin activates and liquefies the adhesive promoter/TBA that is already applied onto the glass lens in the fifth step. This process of activating and liquefying the adhesive promoter/TBA provides a more reliable and robust glass lens. As a result, this creates the heat and the pressure that are already needed for the insert molding. The product obtained is a glass insert molded part. When the glass insert molded part is ejected and cooled, the adhesive promoter/TBA chemistry creates the bond between the glass lens and the molten resin. Thereafter, the glass insert molded part goes through the curing process of becoming hard or solid by cooling or drying or crystallization. After this, the bonding test is done to ensure that the glass lens is hardened, is encapsulated and is permanently bonded within the front housing unit.

During the housing surface decoration stage, the glass insert molded part undergoes a mask making, which is a coating of liner mask over the entire glass, through the masking assembly to prevent the electronic components/display to be visible when the designer ensembles the cellular phones and other types of telephones. Thereafter, the masked glass insert molded part undergoes the decoration process where it is sprayed with paint in the spray paint line chamber.

In the touch panel manufacturing stage, a touch sensor is bonded to a flexible printed circuit board ("F-PCB") film. Thereafter, the touch sensor and F-PCB film bonding part undergoes lamination with a liquid optically clear adhesive ("OCA") or a liquid crystal device ("LCD") and with the glass insert molded part to produce the final assembled glass insert molding housing unit.

Figure 2:
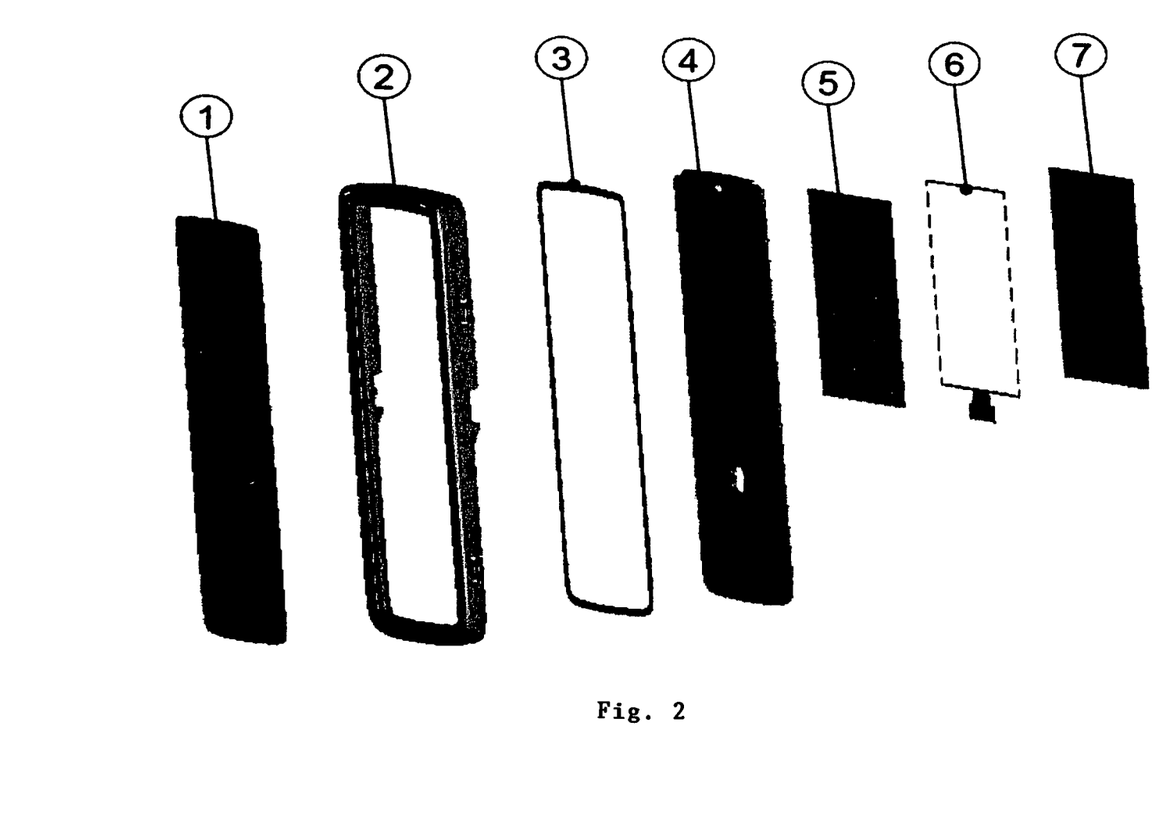
FIG. 2 shows an exploded view the parts involved in making a glass insert molding housing unit of the present invention.

FIG. 2 is an exploded view of the individual parts that make up the final glass insert molding housing unit. It shows a mask, a front housing, an adhesive/ink, a glass lens, a touch sensor film, a F-PCB film and a LCD lamination.

Figure 3:
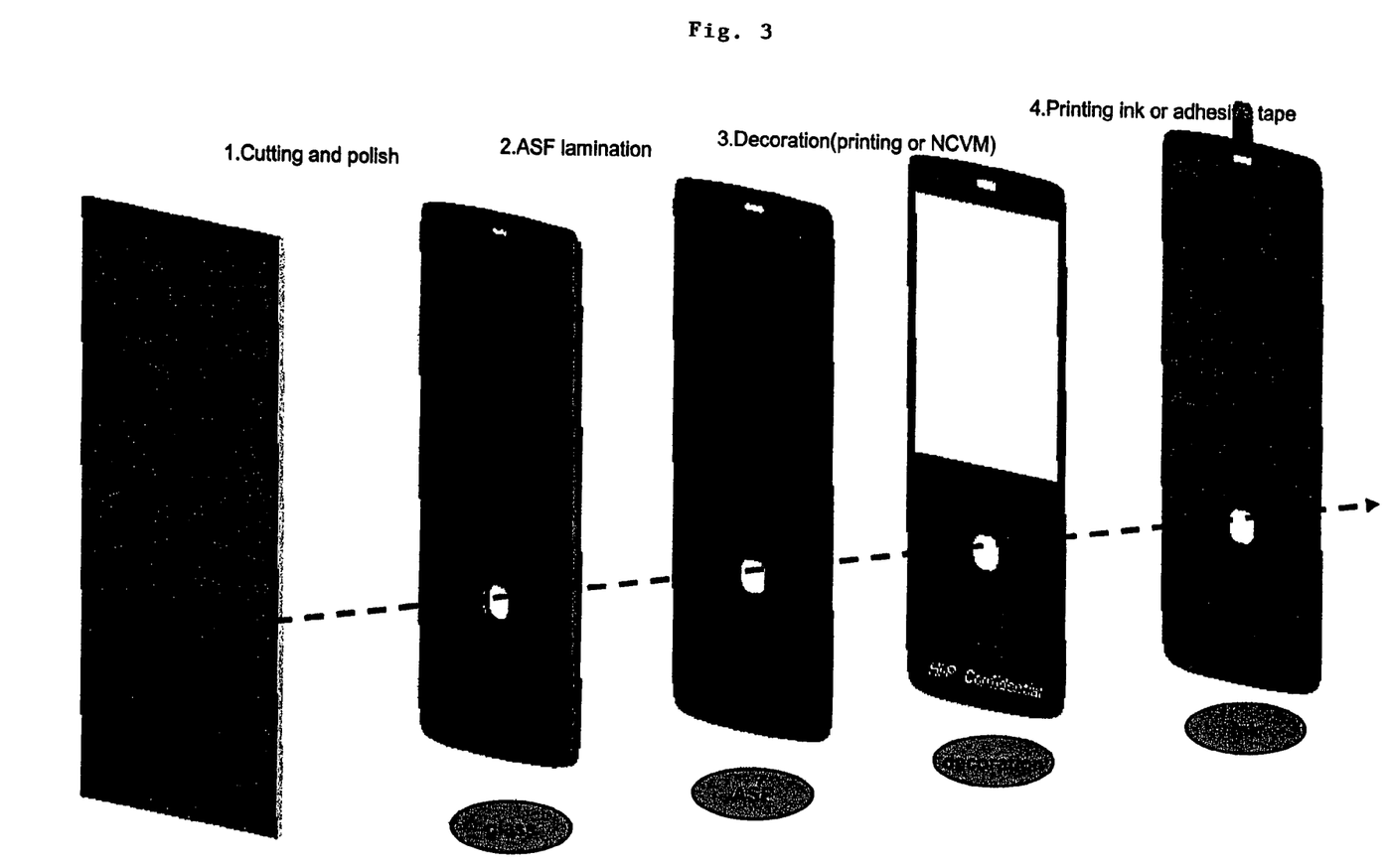
FIG. 3 shows a perspective view of the pre-processing of a glass lens in the present invention.

In FIG. 3, it shows a treatment of a glass lens before the molding of the glass lens into a housing unit. The glass lens undergoes the cutting and polishing process, lamination with the AS film, decoration through printing or Non-Conductive Vacuum Metallization ("NCVM") and printing using printing ink or adhesive tape.

Figure 4:
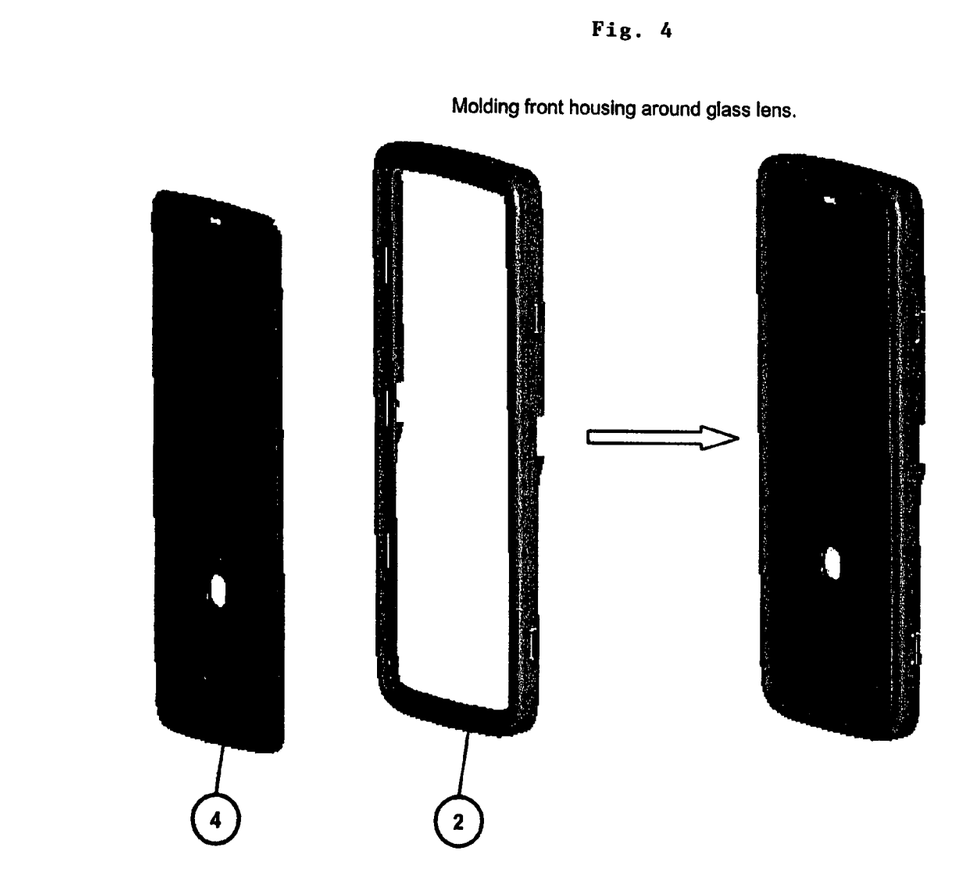
FIG. 4 shows a perspective view of the glass insert molding process in the present invention.

In FIG. 4, a front housing unit is molded around the treated glass lens by a molten resin to produce a glass insert molding housing unit. An adhesive promoter is added onto the glass lens before fitting the glass lens into the front housing unit. The adhesive promoter will provide a more reliable bond between the glass lens and the front housing unit.

Figure 5:
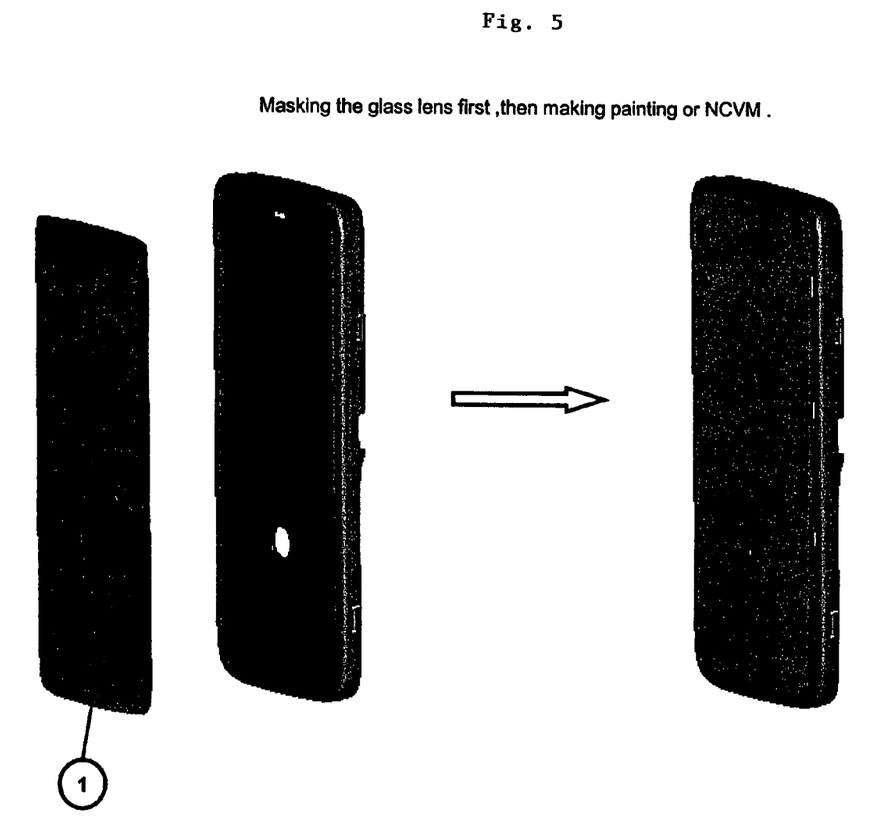
FIG. 5 shows a perspective view of a housing surface decoration process in the present invention.

In FIG. 5, the glass insert molding housing unit undergoes masking and thereafter coating/painting so that the electronics/display to be added later will not be visible.

Figure 6:
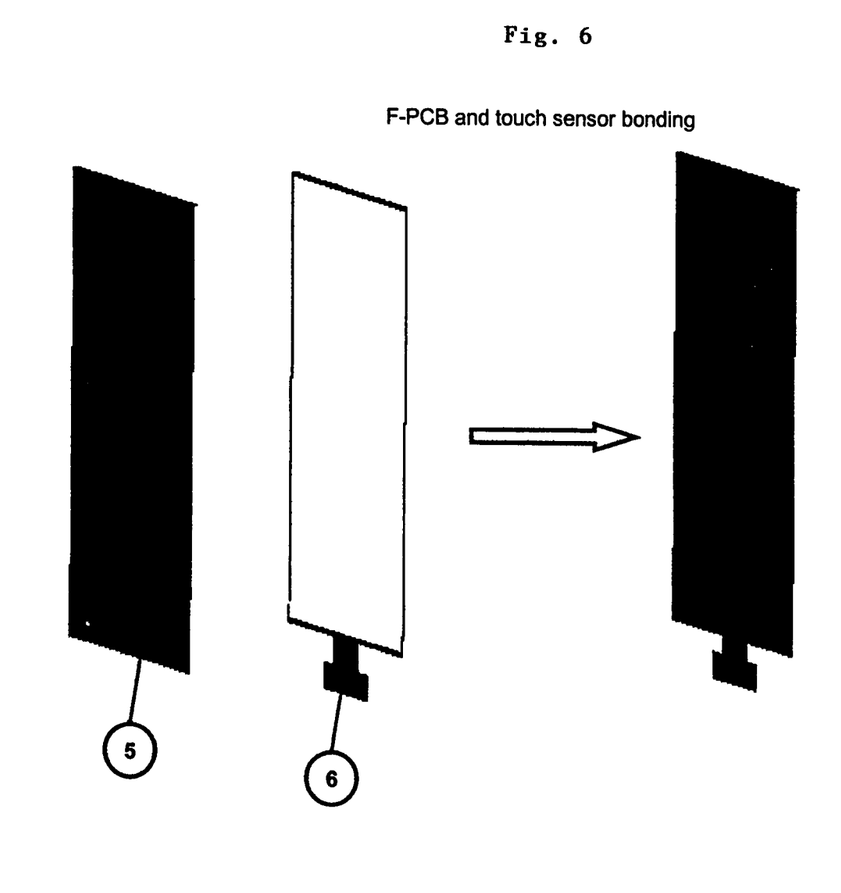
FIG. 6 shows a perspective view of a touch panel bonding process in the present invention.

In FIG. 6, a F-PCB film and a touch sensor film are bonded. The two films are bonded together using optically clear adhesives, gel, or liquid glue. This bonding is required for optical transparency and for mechanical bonding.

Figure 7:
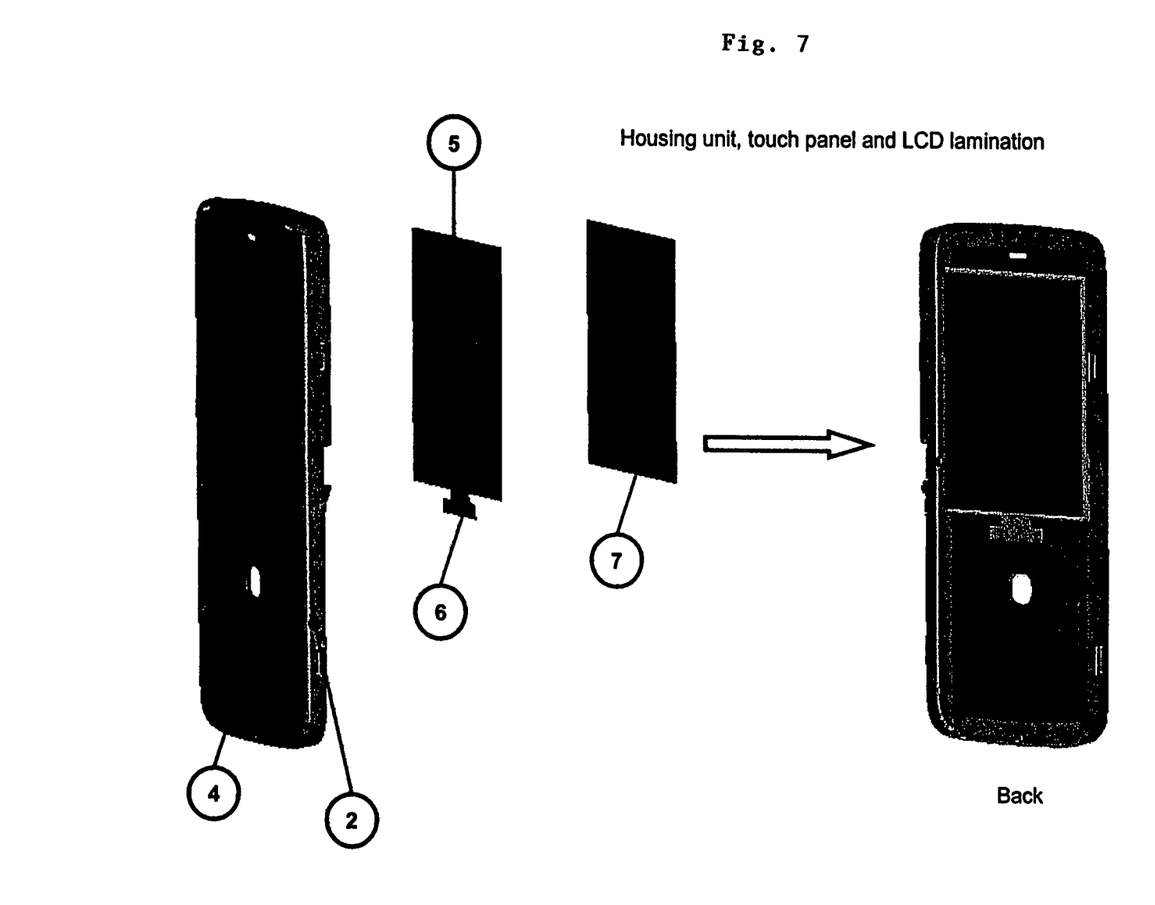
FIG. 7 shows a perspective view of a lamination process in the present invention.

In the lamination process in FIG. 7, bonded F-PCB-touch sensor film is laminated with the glass insert molded part and with the LCD. The lamination is carried out using the optically clear adhesives, gel or liquid glue. The F-PCB-touch sensor film is laminated with the glass insert molded part first, and then the resulting product laminates with the LCD.

Figure 8:
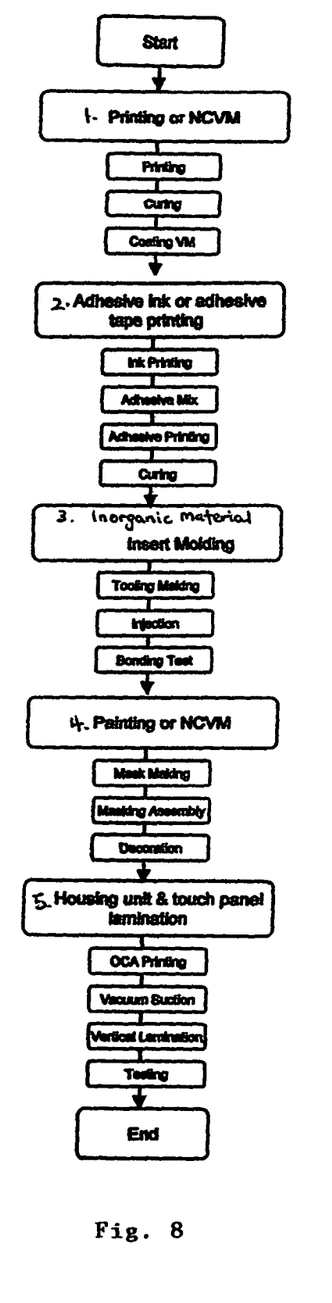
FIG. 8 shows a manufacturing process flow chart of an inorganic material insert molded part.

In FIG. 8, a manufacturing flow chart is provided where an inorganic material goes through a series of five steps to produce an insert molded part. In the first step, the inorganic material undergoes printing using printing ink, curing and coating with paint (VM). The purpose of this step is to apply decoration on the inorganic material. The inorganic material type can be ceramic, metal, fabric, plastics, magnesium etc.

In the next step, the printed inorganic material goes through ink printing using the stencil machine. Thereafter, the inorganic material undergoes a process of overmolding through adhesive mix and adhesive printing. The use of an adhesive promoter also known as adhesive promoter/thermobond adhesive ("TBA"), like in FIG. 1, is significantly unique as a heat activated adhesive in the present invention as the heat activated adhesive has never been activated through a molding process. Like the fifth step in FIG. 1, the adhesive promoter/TBA in this second step is applied firstly onto the inorganic material prior to the insert molding process.

During the insert molding process in third step of FIG. 8, the inorganic material obtained in the second step undergoes the tooling making process where the inorganic material is put into a front housing unit, aligning the inorganic material with the front housing unit in order that the inorganic material lies within the inside of the front housing unit. At the injection process stage, a molten resin is injected into the space forms between the inorganic material and the front housing unit. The molten resin flows around the inorganic material and activates and liquefies the adhesive promoter/TBA that is already applied onto the inorganic material in the second step. This provides a more reliable and robust inorganic material. This process also creates the heat and the pressure that are already needed. After this stage, the bonding test is done to ensure that the inorganic material is hardened, is encapsulated and is permanently bonded within the front housing unit. The product obtained is an insert molded part. When the insert molded part is ejected and cooled, the adhesive promoter/TBA chemistry creates the bond between the inorganic material and the molten resin. Thereafter, the insert molded part goes through the curing process of becoming hard or solid by cooling or drying or crystallization.

During the fourth step of housing surface decoration, the insert molded part undergoes a mask making, which is a coating of liner mask over the entire insert molded part. Thereafter, the masked insert molded part undergoes the decoration process where it is sprayed with paint in the spray paint line chamber. In the fifth step which is the touch panel manufacturing stage, a touch sensor is bonded to a flexible printed circuit board ("F-PCB") film. Thereafter, the touch sensor and F-PCB film bonding part undergoes lamination with a liquid optically clear adhesive ("OCA") or a liquid crystal device ("LCD") and with the insert molded part to produce the final assembled insert molding housing unit.

Those skilled in the art will appreciate that numerous variations and/or modifications may be made to the invention than those specifically described. It is to be understood that the invention includes all such variations and modifications. The present embodiments/examples are, therefore, to be considered in all respects as illustrative and not restrictive.

The invention claimed is:

1. A process for producing an insert molded part comprising the steps of:
    providing a glass lens;
    providing a front housing unit;
    providing a thermobond adhesive;
    applying thermobond adhesive onto the glass lens;
    inserting the glass lens into the front housing unit, aligning the glass lens with the front housing unit such that the glass lens lies within an inside area of the front housing unit and defines a space there between;
    injecting a molten resin, during an insert molding process, into the space formed between the glass lens and the front housing unit;
    wherein the molten resin flows around the glass lens, the molten resin activates and liquefies the thermobond adhesive that is applied onto the glass lens and forms an insert molded part, and when the insert molded part is ejected and cooled, the thermobond adhesive permanently bonds the glass lens and the cooled resin.

2. An insert molded part manufactured by the process of claim 1.

3. A process for producing a glass insert molding housing unit comprising the steps of:
    providing a glass lens;
    providing a front housing unit in the shape of the glass lens;
    applying one of an adhesive promoter and a thermobond adhesive to the glass lens;
    inserting the glass lens into the front housing unit, aligning the glass lens with the front housing unit such that the glass lens lies within an inside area of the front housing unit and defines a space there between;
    injecting a molten resin, during a glass insert molding process, into the space formed between the glass lens and the front housing unit;
    wherein the molten resin flows around the glass lens and forms a glass insert molding housing unit, the molten resin activating and liquefying the one of the adhesive promoter and the thermobond adhesive to create heat and pressure, and when the resin hardens, the front housing unit encapsulates the glass lens and the glass lens permanently bonds within the front housing unit.

4. A glass insert molding housing unit manufactured by the process of claim 3.

5. A process for producing an insert molded part comprising the steps of:
    providing an inorganic material;
    providing a front housing unit;
    providing a thermobond adhesive;
    applying thermobond adhesive onto the inorganic material;
    inserting the inorganic material into the front housing unit, aligning the inorganic material with the front housing unit such that the inorganic material lies within the inside of the front housing unit;
    injecting a molten resin, during an insert molding process, into space formed by the inorganic material and the front housing unit;
    wherein the molten resin flows around the inorganic material, the molten resin activates and liquefies the thermobond adhesive that is applied onto the inorganic material and forms an insert molded part, and when the insert molded part is ejected and cooled, the thermobond adhesive permanently bonds the inorganic material and the resin.

6. The process according to claim 5 wherein the inorganic material is a ceramic.

7. The process according to claim 5 wherein the inorganic material is a metal.

8. The process according to claim 5 wherein the inorganic material is a fabric.

9. An insert molded part manufactured by the process of claim 5.

10. An insert molded part comprising: a front housing unit; a glass lens disposed inside of the front housing unit; a thermobond adhesive applied onto the glass lens; a resin formed between the front housing unit and the glass lens;
    wherein the thermobond adhesive, activated by molten resin during molding, makes direct contact with and permanently bonds to the glass lens and the resin.

* * * * *